April 23, 1963 D. S. TOFFOLO ET AL 3,087,108

FLUX SWITCHING TRANSFORMER

Filed Jan. 3, 1957 2 Sheets-Sheet 1

INVENTORS
DOMINIC S. TOFFOLO
LEE R. LARSON

BY W R Maltby
Richard C Reed ATTORNEYS

April 23, 1963 D. S. TOFFOLO ET AL 3,087,108

FLUX SWITCHING TRANSFORMER

Filed Jan. 3, 1957 2 Sheets-Sheet 2

INVENTORS
DOMINIC S. TOFFOLO
LEE R. LARSON

BY W. R. Mattox
Richard C. Reed
ATTORNEYS

United States Patent Office 3,087,108
Patented Apr. 23, 1963

3,087,108
FLUX SWITCHING TRANSFORMER

Dominic S. Toffolo, 4083 Loraine Drive, Camp Springs, Md., and Lee R. Larson, 1075 S. Cook St., Denver, Colo.

Filed Jan. 3, 1957, Ser. No. 632,399
4 Claims. (Cl. 323—56)
(Granted under Title 35, U.S. Code (1952), sec. 266)

The invention described herein may be manufactured and used by or for the Government of the United States of America for governmental purposes without the payment of any royalties thereon or therefor.

This invention relates to electrical power control devices and in particular to devices for delivering controlled amplitude output signals with high efficiency and a high ratio of output power to control power.

In many instances there exists the need for a control element capable of receiving variable amplitude alternating current input power and of producing an alternating current output having a controllable amplitude. Such power conversion is of course readily accomplished automatically using electron tubes, however circuitry employing electron tubes is subject to many limitations particularly where operation with a minimum of attention under adverse conditions is required.

Apparatus of the type now commonly known as magnetic amplifiers employing core material having rectangular hysteresis characteristics is frequently used in service under adverse conditions, however even such magnetic amplifier apparatus is subject to certain limitations which in many instances may be undesirable. In particular, magnetic amplifiers frequently produce such intermittent and severe loading of the power source during certain portions of the cycle of the alternating current supply as to seriously distort the waveform of the source voltage even where magnetic amplifiers of small power requirements are operated from comparatively large sources. Additionally, temperature limitations on the rectangular hysteresis loop core materials generally prevent operations of such magnetic amplifiers above temperatures of approximately 500 degrees Fahrenheit. These typical limitations indicate the need for a new form of control device.

Accordingly, it is an object of the present invention to provide an electrical power control device of high efficiency for controlling the delivery of power from a source to a load.

Another object of the present invention is to provide an electrical power control device which can operate above 500 degrees Fahrenheit.

Another object of the present invention is to provide an electrical power control device which does not draw intermittent heavy surge currents from the power source.

Figures 1, 2:
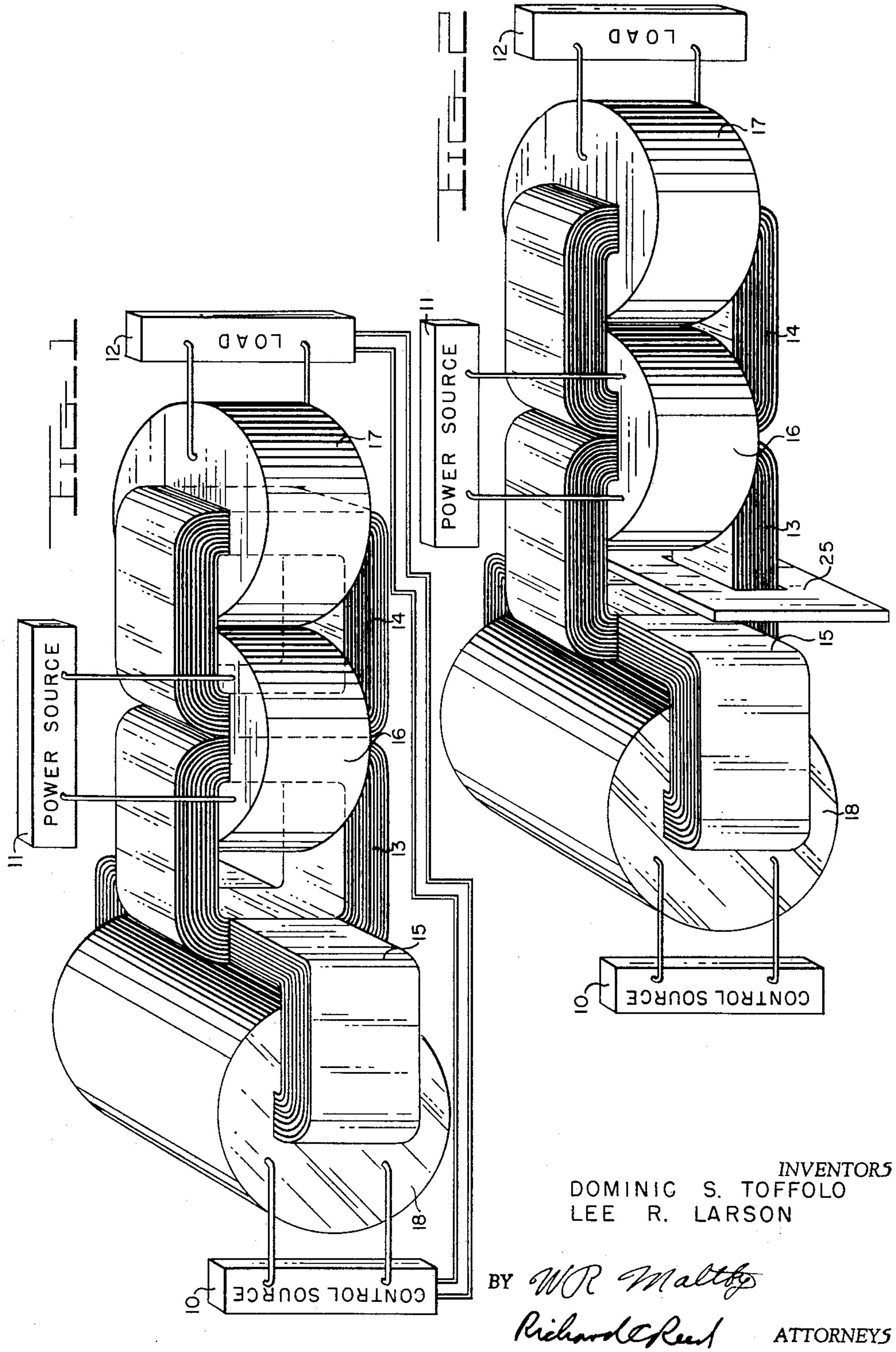

Other and further objects and features of the present invention will become apparent from a careful consideration of the following detailed description in conjunction with the accompanying drawings, wherein FIG. 1 shows a typical electrical control device constructed in accordance with the teachings of the present invention.

Figure 3:
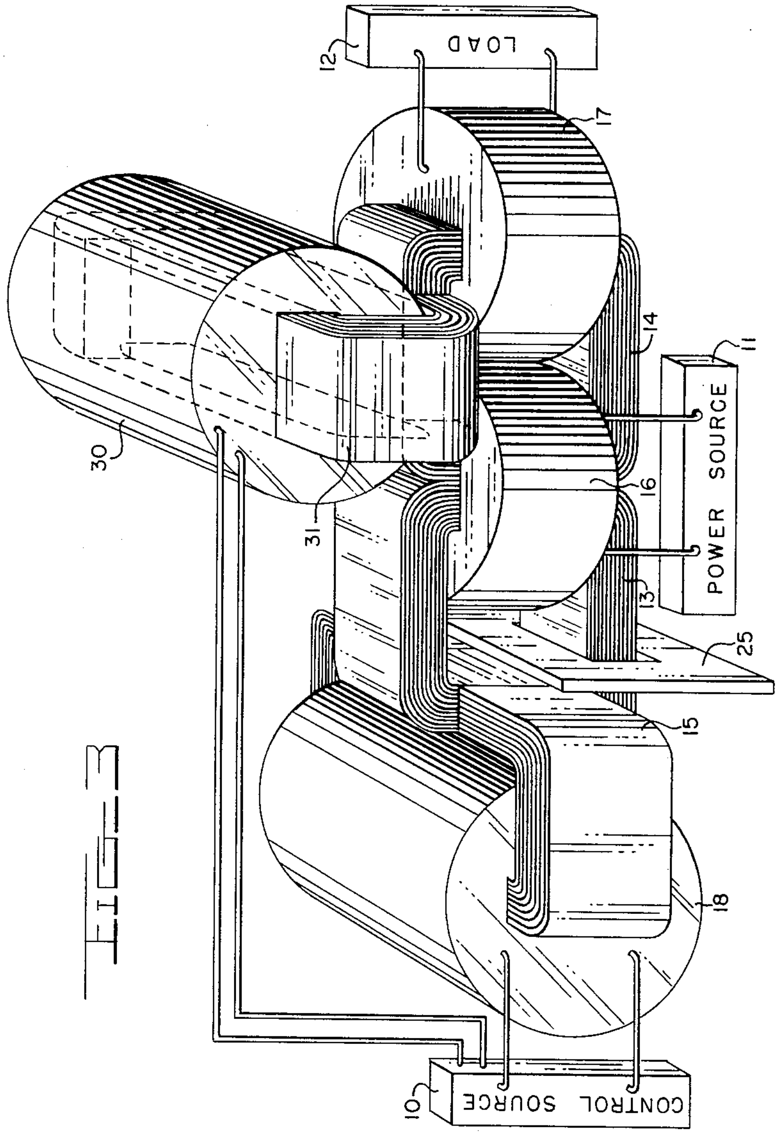

FIGS. 2 and 3 show various refinements of the basic circuit of FIG. 1.

In accordance with the basic principles of the present invention, an electrical control device is provided for controlling the application of electrical energy from a source to a load. The particular apparatus of the present invention is capable of receiving source or input energy which is of an alternating current nature. The power delivered to the load is typically of an alternating current nature, however it is apparent that rectification of such alternating current can be performed if direct current is desired.

The control device is basically a transformer having two separate cores which are linked by one common winding to which is applied the input power. This input winding may be considered the transformer primary. The transformer secondary is disposed on only one of the cores. Control means is provided to control the flux division between the two cores. It may be seen that an alteration in the flux division will alter the effective linkage between primary and secondary, resulting in a maximum linkage between primary and secondary when the primary flux is concentrated in the core containing the secondary winding and a minimum of linkage between primary and secondary when the primary flux is concentrated in the other core.

Control of the division of flux between the two cores is effected by the introduction of additional flux into one or both of the cores which effectively varies the relative reluctance of the two cores.

With reference now to FIG. 1 of the drawing, there is shown the control device together with the control source 10, the power source 11, and the load 12 shown merely as blocks to indicate a complete device. The control device has two basic cores 13 and 14 and an auxiliary or control core 15. Typically the cores 13 and 14 are of rolled ribbon type silicon steel of grain oriented characteristics. These three cores are oriented in such fashion that the cores 13 and 14 have abutting legs on which a winding 16 is placed. Winding 16 is connected to power source 11 and may be considered to be the primary winding of the control device. Winding 17 is also placed upon core 14 and is connected to load 12. Winding 17 may thus be considered to be the secondary winding of the control device.

Core 13 has a substantial portion of its total available area which does not contain primary or secondary windings, however in this uncovered area, an auxiliary magnetic device having the core 15 is located. Core 15 contains a winding 18 which is connected to control source 10, the purpose of which is to set up a flux in core 15 which also traverses a portion of core 13 at right angles to the flux produced in core 13 by winding 16.

The composition of the core 15 depends to a large extent upon the exact purpose for which the control device is used. Typically the core is of either solid or laminated structure and may be made of ribbon wound grain oriented material. It is normally desired that the gaps between the ends of core 15 and the sides of core 13 be kept small to reduce control power requirements for establishing a selected flux level across the core 13. To this end it may be desired to have the sides of core 13 in the area contacted by core 15, as well as the ends of core 15, ground and lapped. In other applications it may be desired to purposely produce a gap between core 15 and core 13 of selected dimensions.

A characteristic of grain oriented core materials which makes such particularly desirable in the present instance for core 13 is the tremendous difference in the permeability in the direction of grain orientation as compared to the permeability at right angles thereto. Thus where permeabilities of the order of several thousand may be common in the grain oriented direction, which is that of flux produced by winding 16, for example, transverse permeabilities of the order of several units will exist for the flux produced in core 13 by winding 18 and core 15. Thus even with core materials of high permeability for core 15, core 13 will provide a substantial reluctance in the total path for flux producer by winding 18.

It is further characteristic of grain oriented core material, that although the transverse permeability is very low compared to the oriented permeability, that percentage changes in the permeability in the grain oriented direction will be substantially equal to percentage changes in the degree of saturation in the transverse direction. Thus flux changes of several units in the transverse flux produced by winding 18 will cause permeability changes of the order of several thousands in the oriented direction of core 13 which is operated on by winding 16.

In operation of the device shown in FIG. 1, approximately the same flux is produced in each of the cores 13 and 14 by winding 16 provided there is no additional flux introduced in core 13 by winding 18 or in core 14 by winding 17. This is true of course in the typical illustration wherein cores 13 and 14 are identical. Such a condition will produce a selected degree of coupling between windings 16 and 17 to induce a selected output voltage in winding 17 which is applied to load 12. If then, the flux in core 13 is removed or blocked by some suitable means without changing the excitation current applied to winding 16, it is apparent that, as long as saturation of core 14 does not occur, the amount of flux in core 14 will be increased. This will effectively increase the coupling between windings 16 and 17 so that an increased output voltage will result for the same excitation voltage applied to winding 16.

The transverse flux produced in core 13 by the winding 18 and core 15 does substantially the same as the foregoing, providing varying degrees of saturation of core 13 in a transverse direction which effects substantially the same percentage change in permeability of core 13 presented to flux produced by winding 16. Thus by changing the amount of current flowing in winding 18, the permeability of core 13 can be varied from a condition which is substantially equal to that of core 14, providing approximately equal flux division between the two cores, to a condition of effective saturation of core 13 wherein flux from winding 16 is concentrated in core 14.

The basic apparatus as hereinabove described can be used advantageously in many ways. Although one of the more obvious uses would appear to be wherein a fixed or variable amplitude alternating voltage is obtained from power source 11 and applied to load 12 in controlled or selected amplitude, it is apparent that appropriate coupling or "feed-back" circuits may be inserted between the output of winding 17 and the control source 10 to vary the control signal applied to winding 18 in whatever sense is required to maintain a selected output amplitude or output amplitude variation despite changes in the voltage from power source 11 and in the current drawn by load 12. Thus the device of the present invention could be used quite effectively as a so-called constant voltage transformer.

It has been found that operation of the basic device as described in connection with FIG. 1 can be improved substantially by the addition of a shorted turn on core 13. This shorted turn is shown in FIG. 2 and is identified by the numeral 25. In operation of the basic device where substantial power is delivered to load 12, current drawn by winding 17 causes some opposition to the establishment of flux in core 14 making it impossible to produce as large a flux in core 14 relative to the flux in core 13 as would be desired. The shorted turn 25 opposes flux changes in core 13 and thereby forces a higher percentage of the flux induced by winding 16 to appear in core 14. It has been found that this shorted turn 25 provides material increases in the overall efficiency of the control device under load. The proportioning of the shorted turn 25 must be done with attention to the effects which this turn produces, for example, it must provide sufficiently low resistance to secure the desired flux distribution while on the other hand is must not be of such low resistance as to interfere too greatly with the establishment of flux in core 13. In general it is preferable to perform some experimentation to determine the optimum dimensions of the shorted turn 25.

An extension of the principles of load distribution is shown in a further illustration of the invention in FIG. 3 to which reference is now had.

It is also possible to control division of the primary flux between cores 13 and 14 by the variation of the permeability of core 14 on which is mounted the output winding. FIG 3 shows such a placement wherein a winding 30 is energized in substantially the same manner as winding 18 to produce a flux in core 31 of substantially the same nature as the flux produced in core 15. Core 31 is disposed, like core 15, in such a manner as to induce a transverse flux in core 14. The control device of winding 30 and core 31 may be employed either to supplement or complement the control provided by winding 18 and core 15. In case it is employed to complement the control winding 18 and core 15 it would normally be energized in opposite sense to winding 18, that is, that current through winding 30 be increased whenever current through winding 18 is decreased and vice versa. Again, in optimization of all variable quantities involved it is sometimes desirable to energize winding 30 by a current such as will result in a different percentage change in permeability of core 14 than occurs in core 13 to compensate at least in part for the presence of winding 17 on core 14. Furthermore there are situations wherein the inclusion of two control windings 18 and 30 on associated cores 15 and 31 and a shorted turn 25 are advantageous.

To assist in the understanding of the invention the following dimensions and other information pertaining to a typical embodiment of the invention constructed in accordance with FIG. 2 is as follows:

Typical dimensions:

| | |
|---|---|
| Outside dimensions of each core | 3½ x 2 x 1 inch thick. |
| Window dimensions of each core | 3 x 1½ inches. |
| Turns of winding 16 | 108. |
| Turns of winding 17 | 180. |
| Turns of winding 18 | 1800. |
| Cross-section area of turn 25 | ¼ square inch (copper). |

Typical operation (to provide variable A.-C. to load 12):

| | |
|---|---|
| Voltage to winding 16 | 110 v. 400 cycles A.-C. |
| D.C. power to winding 18 | 0–14 watts. |
| Output A.C. at winding 17 | 30–690 watts. |
| Average efficiency of secondary to primary | 90%. |
| Efficiency of secondary to primary at 150 watts from secondary | 95%. |

The foregoing tabulation of data is indicative of the high efficiency possible with the device of the present invention. By way of explanation it is noted that an efficiency of 90 degrees on the basis of power-out from winding 17 relative to power-in from source 11 is typical. It is noted that the control power itself is also very low, being of the order of 2 percent of the output power. The result is an overall efficiency approaching that of a conventional non-variable transformer.

Obviously many modifications and variations of the present invention are possible in the light of the above teachings. It is therefore to be understood that within the scope of the appended claims the invention may be practiced otherwise than as specifically described.

What is claimed is:

1. An electrical power control device comprising, a core structure having first and second longitudinal magnetic flux paths, a primary winding disposed upon said core structure having linkage to said magnetic flux paths, a secondary winding disposed upon said core structure to link the first flux path, and means for producing a transverse flux across one of said magnetic flux paths for controlling the relative permeabilities of the first and second magnetic flux paths.

2. An electrical power control device comprising, first and second magnetic core members of grain oriented characteristics, a primary winding disposed upon said core members having linkage to said members, a secondary winding disposed on the first core member, and means for producing a transverse flux across one of said magnetic core members for controlling the relative permeabilities of the first and second magnetic core members.

3. An electrical power control device comprising, first and second magnetic core members of grain oriented characteristics, a primary winding disposed upon said core members having linkage to said members, a secondary winding disposed on the first core member, means for producing a transverse flux across a portion of the second magnetic core member for controlling the relative permeabilities of the first and second magnetic core members, and a shorted winding linking the second magnetic core member for opposing flux changes in the second magnetic core member.

4. An electrical power control device comprising, first and second magnetic core members of grain oriented characteristics, a primary winding disposed upon said core members having linkage to said members, a secondary winding disposed on the first core member, first control means for producing a transverse flux across a portion of the first magnetic core member for controlling the permeability thereof, second control means for producing a transverse flux across a portion of the second magnetic core member for controlling the permeability thereof, means for varying the flux produced by said first control means and said second control means in an inverse sense for varying the relative permeabilities of the first and second magnetic core members, and a shorted winding linking the second magnetic core member for opposing flux changes in the second magnetic core member.

References Cited in the file of this patent

UNITED STATES PATENTS

| | | |
|---|---|---|
| 1,815,516 | Lee | July 21, 1931 |
| 1,891,044 | Dowling | Dec. 13, 1932 |
| 1,910,381 | Dowling | May 23, 1933 |
| 1,995,530 | Askey | Mar. 26, 1935 |
| 2,466,028 | Klemperer | Apr. 5, 1949 |
| 2,644,109 | Mulder | June 30, 1953 |
| 2,703,391 | Gunderson | Mar. 1, 1955 |
| 2,814,786 | Naul | Nov. 26, 1957 |
| 2,844,804 | Roe | July 22, 1958 |

FOREIGN PATENTS

| | | |
|---|---|---|
| 702,814 | Germany | Feb. 17, 1941 |

OTHER REFERENCES

Abstract: Langsdorf, 212,266, published in O.G. of June 30, 1953.

New Saturable Reactor Principle, Electrical Engineering, November 1958, page 1127.